United States Patent
Yan et al.

(10) Patent No.: US 9,258,060 B2
(45) Date of Patent: Feb. 9, 2016

(54) METHOD AND APPARATUS FOR COMPENSATING NONLINEAR DISTORTIONS IN INTENSITY MODULATION-DIRECT DETECTION SYSTEM

(71) Applicant: FUJITSU LIMITED, Kawasaki-shi, Kanagawa (JP)

(72) Inventors: Weizhen Yan, Beijing (CN); Bo Liu, Beijing (CN); Lei Li, Beijing (CN); Zhenning Tao, Beijing (CN); Toshiki Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 13/860,616

(22) Filed: Apr. 11, 2013

(65) Prior Publication Data

US 2013/0272719 A1    Oct. 17, 2013

(30) Foreign Application Priority Data

Apr. 11, 2012 (CN) .......................... 2012 1 0105367

(51) Int. Cl.
*H03H 7/30* (2006.01)
*H04B 10/2507* (2013.01)
(Continued)

(52) U.S. Cl.
CPC ........ *H04B 10/2507* (2013.01); *H04L 25/0202* (2013.01); *H04L 25/03019* (2013.01); *H04L 2025/03375* (2013.01); *H04L 2025/03592* (2013.01)

(58) Field of Classification Search
CPC .................... H04B 10/2507; H04L 25/03019; H04L 2025/03592; H04L 25/03038; H04L 25/03057; H04L 2025/03617; H04L 2025/03477; H04L 1/0057; H03H 21/0012; G11B 20/10009
USPC .......... 375/232, 231, 230, 229, 319, 316, 295
See application file for complete search history.

(56) References Cited

U.S. PATENT DOCUMENTS

| | | | |
|---|---|---|---|
| 6,292,816 B1 * | 9/2001 | Kim ............................. 708/323 |
| 2007/0203418 A1 * | 8/2007 | Starc ............................. 600/509 |

(Continued)

FOREIGN PATENT DOCUMENTS

| | | |
|---|---|---|
| CA | 2 705 969 | 12/2011 |
| CN | 101425851 | 5/2009 |

(Continued)

OTHER PUBLICATIONS

Extended European Search Report dated Sep. 23, 2014 in corresponding European Patent Application No. 13163313.3.

(Continued)

*Primary Examiner* — Zewdu Kassa
(74) *Attorney, Agent, or Firm* — Staas & Halsey LLP

(57) ABSTRACT

The embodiments of the present invention provide a method and an apparatus for compensating nonlinear distortions in an intensity modulation-direct detection (IM-DD) system; wherein the method comprises: calculating, according to nonlinear coefficients and differences between values of an input signal at different time, nonlinear distortions of the input signal, so as to eliminate the nonlinearity distortions. By applying the method and the apparatus provided by the embodiments of the present invention, nonlinear cost of the IM-DD system can be effectively reduced, thereby improving the system capacity.

13 Claims, 3 Drawing Sheets

(51) Int. Cl.
*H04L 25/02* (2006.01)
*H04L 25/03* (2006.01)

(56) References Cited

U.S. PATENT DOCUMENTS

| | | |
|---|---|---|
| 2009/0185613 A1 | 7/2009 | Agazzi et al. |
| 2010/0014873 A1 | 1/2010 | Bulow |
| 2011/0064421 A1 | 3/2011 | Zhang et al. |

FOREIGN PATENT DOCUMENTS

| | | |
|---|---|---|
| CN | 101631095 | 1/2010 |
| CN | 101965698 | 2/2011 |

OTHER PUBLICATIONS

Katz et al., "Analytical Solution of Optimal Electrical Equalization Coefficents", IEEE, Communications, 2006, pp. 2749-2754.

Papagiannakis, "Electronic distortion compensation in the mitigation of optical transmission impairments: the view of joint project on mitigation of optical transmission impairments by electronic means ePhoton/ONe+ project", IET Optoelectronics, The Institution of Engineering and Technology, vol. 3, Issue 2, 2009, pp. 73-85.

Chinese Office Action mailed Jun. 2, 2015 in corresponding Chinese Application No. CN201210105367.0.

* cited by examiner calculating nonlinear distortions of an input signal according to nonlinear coefficients and differences between values of the input signal at different time    601

METHOD AND APPARATUS FOR COMPENSATING NONLINEAR DISTORTIONS IN INTENSITY MODULATION-DIRECT DETECTION SYSTEM

CROSS-REFERENCE TO RELATED APPLICATION

This application is based upon and claims the benefit of priority of the prior Chinese Patent Application No. 201210105367.0, filed on Apr. 11, 2012, the entire contents of which are incorporated herein by reference.

TECHNICAL FIELD

The present invention relates to the communications field and, in particular, to a method and an apparatus for compensating nonlinear distortions in an intensity modulation-direct detection (IM-DD) system.

BACKGROUND ART

An intensity modulation-direct detection (IM-DD) system is a common optical communication system. The characteristic of this system is to modulate transmitting information on the intensity of light at a transmitting end and to directly perform envelope detection at a receiving end, thereby obtaining transmitted information.

In the implementation of the present invention, the inventors found that a square-law photodetector is usually used at a receiving end in the IM-DD system, whereby a nonlinear operation is introduced, thus resulting in nonlinear cost of the IM-DD system, thereby reducing the performance.

It should be noted that the above introduction to the background art is given for the clear and complete description of the technical solution of the present invention and for the understanding by those skilled in the art. The above technical solutions should not be deemed as being known to those skilled in the art for having been described in the background art of the present invention.

SUMMARY OF THE INVENTION

The object of the embodiments of the present invention is to provide a method and an apparatus for compensating nonlinear distortions in an intensity modulation-direct detection (IM-DD) system, so as to compensate nonlinear distortions introduced due to the direct detection at a receiving end of the IM-DD system.

According to an aspect of the present invention, there is provided a nonlinear equalizer, wherein the nonlinear equalizer comprises:

a calculation module for calculating, according to nonlinear coefficients and differences between values of an input signal at different time, nonlinear distortions of the input signal, so as to eliminate the nonlinear distortions.

According to another aspect of the present invention, there is provided a receiver, comprising: a direct detection unit, an analog-digital conversion unit, the above-described nonlinear equalizer and a data recovery unit, wherein the direct detection unit is configured for performing directly detection on an input signal;

the analog-digital conversion unit is configured for performing an analog-digital conversion on the signal detected by the direct detection unit;

the nonlinear equalizer is configured for performing nonlinear distortions compensation on the signal converted by the analog-digital conversion unit; and the data recovery unit is configured for performing data recovery on the signal compensated by the nonlinear equalizer.

According to still another aspect of the present invention, there is provided a transmitter, comprising: a signal generation unit, the above-described nonlinear equalizer, a digital-analog conversion unit and an intensity modulation unit, wherein the signal generation unit is configured for generating an input signal for transmission according to input data;

the nonlinear equalizer is configured for performing nonlinear distortions compensation on the input signal;

the digital-analog conversion unit is configured for performing a digital-analog conversion on the signal compensated by the nonlinear equalizer; and the intensity modulation unit is configured for performing intensity modulation on the signal converted by the digital-analog conversion unit.

According to further still another aspect of the present invention, there is provided a transmission system, wherein the transmission system comprises the above-described transmitter and/or the above-described receiver.

According to yet still another aspect of the present invention, there is provided a method for compensating nonlinear distortions in an intensity modulation-direct detection (IM-DD) system, wherein the method comprises:

calculating, according to nonlinear coefficients and differences between values of an input signal at different time, nonlinear distortions of the input signal, so as to eliminate the nonlinear distortions.

The advantages of the embodiments of the present invention exist in that: by applying the method and the apparatus provided by the embodiments of the present invention, nonlinear cost of the IM-DD system can be effectively reduced, thereby improving the system capacity.

Particular embodiments of the present invention will be described in detail below with reference to the following description and attached drawings and the manners of using the principle of the present invention are pointed out. It should be understood that the implementation of the present invention is not limited thereto in scope. Rather, the invention includes all changes, modifications and equivalents coming within the spirit and terms of the appended claims.

Features which are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the present invention, corresponding portions of the drawings may be exaggerated or reduced in size. Elements and features depicted in one drawing or embodiment of the present invention may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE INVENTION

The foregoing and other features of the embodiments of the present invention will be apparent through the following description with reference to the drawings. These embodiments are merely illustrative and not intended to limit the present invention. For the easy understanding of the principle and the embodiments of the present invention by those skilled in the art, the description of the embodiments of the present invention will be given taking an intensity modulation-direct detection (IM-DD) system as an example; however, it should be understood that the embodiments of the present invention are not limited to such a system.

Embodiment 1

Figure 1A:
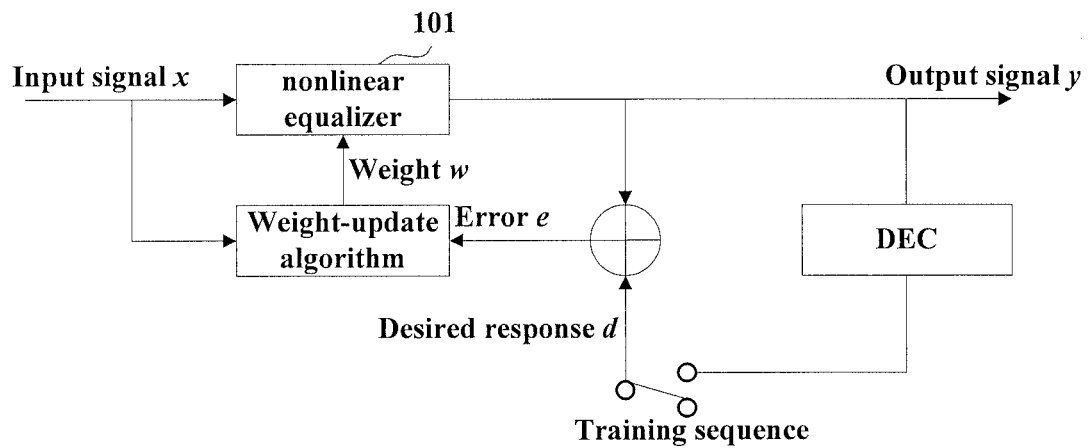
FIG. 1a is a schematic diagram of the composition of a nonlinear equalizer according to an embodiment of the present invention.
Figure 1B:
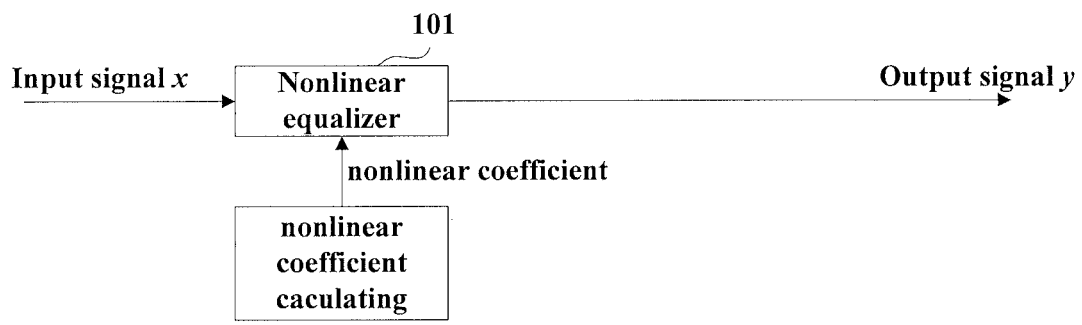
FIG. 1b is a schematic diagram of the composition of a nonlinear equalizer according to another embodiment of the present invention.

An embodiment of the present invention provides a nonlinear equalizer in an intensity modulation-direct detection (IM-DD) system. FIG. 1a is a schematic diagram of the composition of an example of the nonlinear equalizer; and FIG. 1b is a schematic diagram of the composition of another example of the nonlinear equalizer. Referring to FIGS. 1a and 1b, the nonlinear equalizer comprises:

a calculation module 101 for calculating, according to nonlinear coefficients and differences between values of an input signal at different time, nonlinear distortions of the input signal, so as to eliminate the nonlinear distortions, wherein, the nonlinear coefficients can be adaptively obtained by Recursive Least Square (RLS) or Least Mean Square (LMS) etc. and can also be calculated according to a unit impulse response of a channel, the details are as follows.

Referring to FIG. 1a, x is an input signal of the nonlinear equalizer and y is an output signal of the nonlinear equalizer. As described above, the coefficients of the nonlinear equalizer can be updated by an adaptive algorithm, such as the RLS and the LMS (referring to the document *Adaptive Filter Theory*, written by Simon Haykin). A desired response is offered by a training sequence or a decision (DEC) module. An error signal is a difference between the current output and the desired response.

Referring to FIG. 1b, what is different from FIG. 1a is that the nonlinear coefficient of the nonlinear equalizer is calculated according to the unit impulse response h of a channel as described above. In an embodiment, the nonlinear coefficient can be calculated according to the following formula:

$$c_{i,k} = \frac{1}{4P_0} \operatorname{Re}(h_k h_i^*)$$

where, $P_0$ is DC optical power, h is a unit impulse response of a channel, i.e., an Inverse Fourier transform of a transfer function of the channel, and meanings of k and i are the same as the following description.

In an embodiment, h can be calculated according to the following known formula but is not limited thereto in this embodiment:

$$h = ifft(e^{j\beta_2 L \omega^2 / 2})$$

where, $\beta_2$ is a dispersion coefficient of a fiber, L is the length of the fiber, and $\omega$ is the angular frequency of a baseband signal.

In this embodiment, according to characteristics of the IM-DD system, liner distortions and nonlinear distortions resulted from the direct detection of a receiver can be described by the following expression:

$$\begin{aligned} R_t &= \left| \sqrt{S_t + P_0} \otimes h_t \right|^2 \\ &= \sum_{k=-N}^{N} |h_k|^2 S_{t-k} + \sum_{i=-N}^{N} \sum_{k=-N}^{i-1} \operatorname{Re}(h_k h_i^*)(S_{t-i} + S_{t-k}) - \\ &\quad \frac{1}{4P_0} \sum_{i=-N}^{N} \sum_{k=-N}^{i-1} \operatorname{Re}(h_k h_i^*)(S_{t-i} + S_{t-k})^2 \\ &= \sum_{k=-N}^{N} c_k S_{t-k} + \sum_{i=-N}^{N} \sum_{k=-N}^{i-1} c_{i,k}(S_{t-i} - S_{t-k})^2 \end{aligned} \quad (1)$$

where, S is a transmitted signal, R is a receiving signal, $P_0$ is DC optical power, h is a unit impulse response of a channel, i.e., an Inverse Fourier transform of a transfer function of the channel, and N is the unilateral time memory length of the nonlinear effect, and its unit is the number of sample points and it can be a natural number. Accordingly, the linear characteristic of the IM-DD system can be represented by the linear coefficient $c_k$, and the liner distortions thereof are namely $$\sum_{k=-N}^{N} c_k S_{t-k}$$

in formula (1); and the nonlinear characteristic of the IM-DD system can be represented by the nonlinear coefficients $c_{i,k}$, and the nonlinear distortions thereof are namely $$\sum_{i=-N}^{N}\sum_{k=-N}^{i-1} c_{i,k}(S_{t-i} - S_{t-k})^2$$

in formula (1).

It can be known from the formula (1) that the nonlinear distortions of the input signal can be represented by the nonlinear coefficients $c_{i,k}$ and differences $(S_{t-i}-S_{t-k})$ between values of the input signal at different time, where, t is a current moment, and t-i and t-k are respectively two different moments, and the nonlinear coefficients $c_{i,k}$ can be obtained by the existing means, for example, as described above, updated by an adaptive algorithm, or calculated according to a unit impulse response of a channel.

According to the formula (1), in an embodiment, the calculation module 101 is configured to calculate the nonlinear distortions of the input signal according to the following formula:

$$\Delta_t = \sum_{i=-N}^{N}\sum_{k=-N}^{i-1} c_{i,k}(x_{t-i} - x_{t-k})^2 \quad (2)$$

where, $\Delta_t$ is the nonlinear distortions of the input signal, $c_{i,k}$ is the nonlinear coefficients, $x_{t-i}$, $x_{t-k}$, $x_{t+i}$ and $x_{t+k}$ are the values of the input signal at different time, and the meanings of other parameters are the same as those in the formula (1).

In this embodiment, for an equalizer whose time memory length of nonlinear effect is 2N+1, the number of nonlinear terms thereof is $2N^2+N$.

Figure 2:
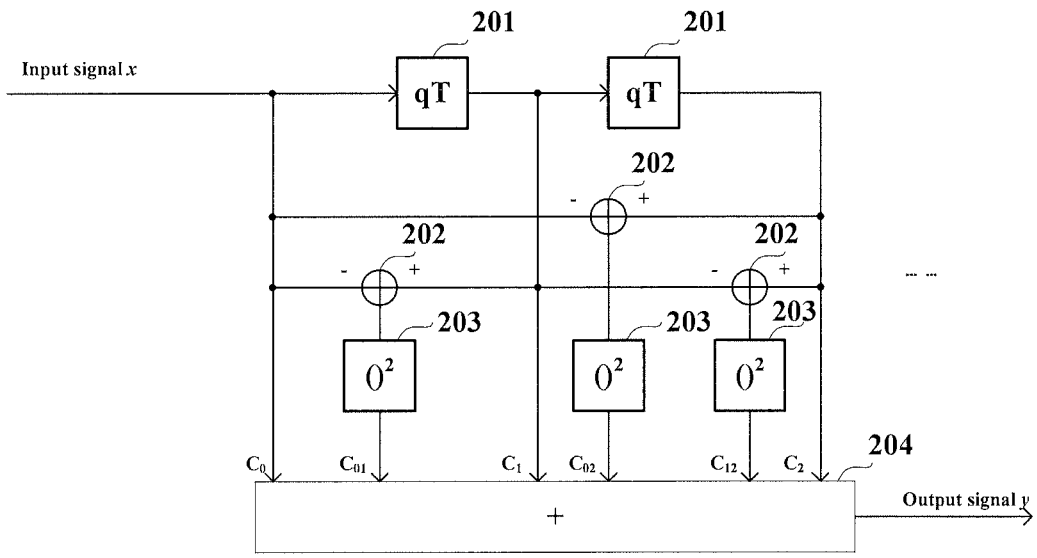
FIG. 2 is a schematic diagram of the composition of a calculation module of a nonlinear equalizer according to an embodiment of the present invention.

In this embodiment, FIG. 2 shows schematically the structure of the calculation module 101 corresponding to the formula (2), where, x is an input signal of the nonlinear equalizer, y is an output signal of the nonlinear equalizer, c is a tap coefficient of the equalizer, T is duration of each symbol, and qT denotes the sampling interval of the nonlinear equalizer. In general cases, the same sampling interval is adopted for the linear parts and nonlinear parts in an equalizer. For example, set q to be 1/2, that is, double oversampling is adopted.

Referring to FIG. 2, the calculation module 101 comprises:

2N delayers 201 for delaying the input signal in accordance with a predetermined sampling interval;

$2N^2+N$ adders 202 for performing a difference operation on the values of the input signal at different time;

$2N^2+N$ squarers 203 for performing a square operation on the differences between the values of the input signal at different time; and one summator 204 for performing a summation operation on the operation result of each of the squarers 203.

According to the formula (1), in another embodiment, the calculation module 101 is configured to calculate the nonlinear distortions of the input signal according to the following formula:

$$\Delta_t = \sum_{i=1}^{N}\sum_{k=0}^{N} c_{i,k} \quad (3)$$
$$[(x_{t-i} - x_{t-k})^2 + (x_{t-i} - x_{t+k})^2 + (x_{t+i} - x_{t-k})^2 + (x_{t+i} - x_{t+k})^2]$$

where, the meaning of each parameter is the same as that in formula (2).

In this embodiment, according to the symmetry of the unit impulse response of a fiber dispersion channel, i.e., $h_k=h_{-k}$, the structure of the calculation module 101 of the nonlinear equalizer can be simplified. According to the symmetry, the relationship between the nonlinear coefficients can be represent as $c_{i,k}=c_{i,-k}=c_{-i,k}=c_{-i,-k}$. A new structure of the calculation module 101 of the nonlinear equalizer, i.e., the structure of the calculation module 101 corresponding to the formula (3), can be obtained by merging terms having the same nonlinear coefficient in the formula (2). In this case, for an equalizer whose time memory length of nonlinear effect is 2N+1, the number of nonlinear terms thereof is $N^2+N$.

In this case, the structure of the calculation module 101 corresponding to the formula (3) can be determined according to the formula (3), which will not be described any further.

According to the formula (1), in still another embodiment, the calculation module 101 is configured to calculate the nonlinear distortions of the input signal according to the following formula:

$$\Delta_t = \sum_{i=1}^{N}\sum_{k=0}^{i} c_{i,k} \quad (4)$$
$$[(x_{t-i} - x_{t-k})^2 + (x_{t-i} - x_{t+k})^2 + (x_{t+i} - x_{t-k})^2 + (x_{t+i} - x_{t+k})^2]$$

where, the meaning of each parameter is the same as that in formula (2).

In this embodiment, the reciprocity of indexes i and k of the nonlinear terms in the formula (3) is used, that is, if i and k are interchanged, the values of the nonlinear terms are equal. A simpler structure of the nonlinear equalizer, i.e., the structure of the calculation module 101 corresponding to the formula (4), can be obtained by merging the nonlinear terms having the same value. In this case, for an equalizer whose time memory length of nonlinear effect is 2N+1, the number of nonlinear terms thereof is $0.5*N^2+1.5*N$.

The nonlinear equalizer for compensating nonlinear distortions provided by the embodiments of the present invention is applicable to, but not limited to, various kinds of modulation formats, such as mPSK, mQAM, and mAPSK etc., and subcarrier multiplexing or OFDM (Orthogonal Frequency Division Multiplexing) technology and DMT (Discrete Multi-Tone) technology etc.

In order to compensate nonlinear distortions of an intensity modulation-direct detection system, the embodiments of the present invention provides a nonlinear equalizer whereby nonlinear cost of the IM-DD system can be effectively reduced by taking nonlinear terms resulted from a square-law detector into consideration, thereby improving the system capacity.

Embodiment 2

Figure 3:
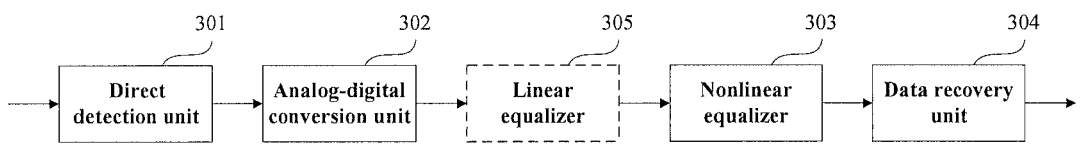
FIG. 3 is a schematic diagram of the composition of a receiver according to an embodiment of the present invention.

An embodiment of the present invention further provides a receiver. FIG. 3 is a schematic diagram of the composition of the receiver; referring to FIG. 3, the receiver comprises: a direct detection unit 301, an analog-digital conversion unit 302, a nonlinear equalizer 303 and a data recovery unit 304, wherein the direct detection unit 301 is configured for performing directly detection on an input signal;

the analog-digital conversion unit 302 is configured for performing an analog-digital conversion on the signal detected by the direct detection unit;

the nonlinear equalizer 303 is configured for performing nonlinear distortions compensation on the signal converted by the analog-digital conversion unit 302; the nonlinear equalizer 303 can be implemented by the nonlinear equalizer in the embodiment 1, and the contents thereof are incorporated herein, which will not be described any further;

the data recovery unit 304 is configured for performing data recovery on the signal compensated by the nonlinear equalizer 303.

In this embodiment, the nonlinear equalizer 303 can be located after the analog-digital conversion unit 302 of the receiver and before the data recovery unit 304.

In another embodiment, the receiver further comprises a linear equalizer 305, and as shown in FIG. 3, the linear equalizer 305 can be located before the nonlinear equalizer 303 of the embodiment of the present invention.

In this embodiment, the data recovery performed by the data recovery unit 304 refers to generalized data recovery which can be performed by way of judgment and can also be performed by way of demodulation scheme such as OFDM or DMT etc., but the embodiment of the present invention is not limited thereto.

In this embodiment, the direct detection unit 301, the analog-digital conversion unit 302, the data recovery unit 304 and the linear equalizer 305 can all be implemented by the existing structure and function, but the embodiment of the present invention is not limited thereto.

The nonlinear equalizer is introduced to the receiver of the embodiment of the present invention and the nonlinear terms resulted from a square-law detector are taken into consideration in the nonlinear equalizer, and therefore, nonlinear cost of the IM-DD system can be effectively reduced, thereby improving the system capacity.

Embodiment 3

Figure 4:
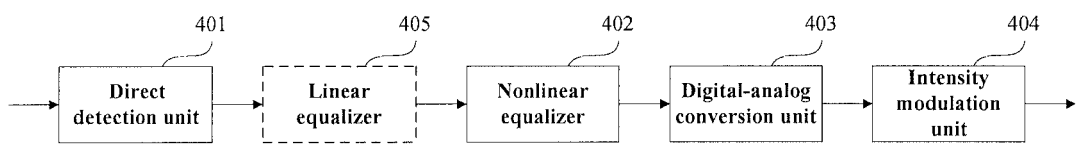
FIG. 4 is a schematic diagram of the composition of a transmitter according to an embodiment of the present invention.

An embodiment of the present invention further provides a transmitter. FIG. 4 is a schematic diagram of the composition of the transmitter; referring to FIG. 4, the transmitter comprises: a signal generation unit 401, a nonlinear equalizer 402, a digital-analog conversion unit 403 and an intensity modulation unit 404, wherein the signal generation unit 401 is configured for generating an input signal for transmission according to input data;

the nonlinear equalizer 402 is configured for performing nonlinear distortions compensation on the input signal; in this embodiment, the nonlinear equalizer 402 can be implemented by the nonlinear equalizer in the embodiment 1, and the contents thereof are incorporated herein, which will not be described any further;

the digital-analog conversion unit 403 is configured for performing a digital-analog conversion on the signal compensated by the nonlinear equalizer 402;

the intensity modulation unit 404 is configured for performing intensity modulation on the signal converted by the digital-analog conversion unit 403.

In this embodiment, the nonlinear equalizer 402 can be located after the signal generation unit 401 and before the digital-analog conversion unit 403.

In another embodiment, the transmitter further comprises a linear equalizer 405, and as shown in FIG. 4, the linear equalizer 405 can be located before the nonlinear equalizer 402 of the embodiment of the present invention.

In this embodiment, the signal generation performed by the signal generation unit 401 refers to generalized data generation which can be performed by way of common data mapping and also be performed by way of modulation scheme such as OFDM or DMT etc., but the embodiment of the present invention is not limited thereto.

In this embodiment, the signal generation unit 401, the digital-analog conversion unit 403 and the intensity modulation unit 404 and the linear equalizer 405 can all be implemented by the existing structure and function, but the embodiment of the present invention is not limited thereto.

The nonlinear equalizer is introduced to the transmitter of the embodiment of the present invention and the nonlinear terms resulted from a square-law detector are taken into consideration in the nonlinear equalizer, and therefore, nonlinear cost of the IM-DD system can be effectively reduced, thereby improving the system capacity.

Embodiment 4

Figure 5:
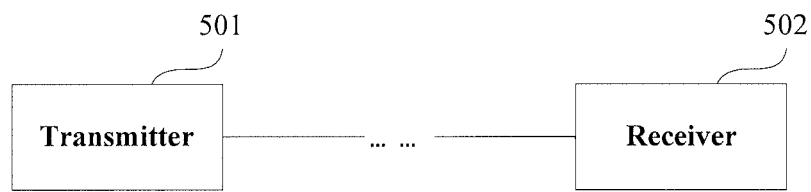
FIG. 5 is a schematic diagram of the composition of a transmission system according to an embodiment of the present invention.

An embodiment of the present invention further provides a transmission system. FIG. 5 is a schematic diagram of the composition of the transmission system; referring to FIG. 5, the transmission system comprises a transmitter 501 and a receiver 502, wherein the transmitter 501 can be implemented by the transmitter in the embodiment 3, and the contents thereof are incorporated herein, which will not be described any further; and the receiver 502 can be implemented by the receiver in the embodiment 2, and the contents thereof are incorporated herein, which will not be described any further.

The nonlinear equalizer is introduced to the transmitter or the receiver of the transmission system of the embodiment of the present invention and the nonlinear terms resulted from a square-law detector are taken into consideration in the nonlinear equalizer, and therefore, nonlinear cost of the IM-DD system can be effectively reduced, thereby improving the system capacity.

The present invention further provides a method for compensating nonlinear distortions in an intensity modulation-direct detection (IM-DD) system, and as described in the following Embodiment 5, since the principle of the method for solving the problem is similar to the calculation module 101 of the nonlinear equalizer of Embodiment 1, the specific implementation thereof can refer to the implementation of the nonlinear equalizer of embodiment 1, and the similarities will not be described any further.

Embodiment 5

Figures 6, 7:
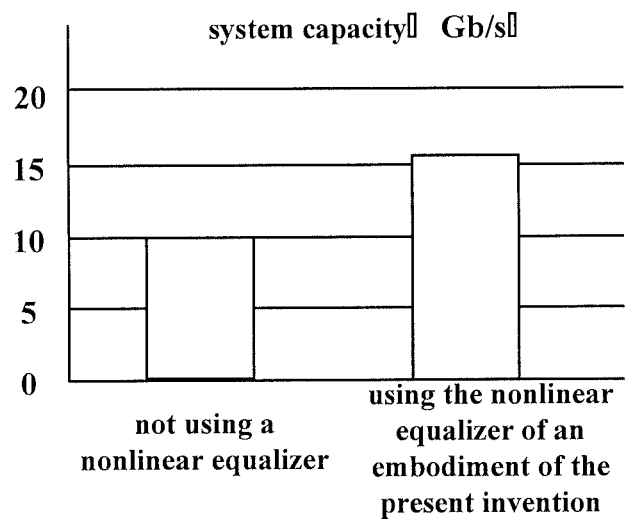
FIG. 6 is a flowchart of a method for compensating nonlinear distortions in an intensity modulation-direct detection (IM-DD) system according to an embodiment of the present invention.
FIG. 7 is a schematic diagram of verification of performances.

An embodiment of the present invention further provides a method for compensating nonlinear distortions in an intensity modulation-direct detection (IM-DD) system. FIG. 6 is a flowchart of the method; referring to FIG. 6, the method comprises:

calculation step 601 for calculating, according to nonlinear coefficients and differences between values of an input signal at different time, nonlinear distortions of the input signal, so as to eliminate the nonlinear distortions.

In this embodiment, the nonlinear distortions of the input signal can be calculated according to any of the following formulae:

$$\Delta_t = \sum_{i=-N}^{N} \sum_{k=-N}^{i-1} c_{i,k} (x_{t-i} - x_{t-k})^2 ; \text{ or}$$

-continued $$\Delta_t = \sum_{i=1}^{N} \sum_{k=0}^{N} c_{i,k}$$
$$[(x_{t-i} - x_{t-k})^2 + (x_{t-i} - x_{t+k})^2 + (x_{t+i} - x_{t-k})^2 + (x_{t+i} - x_{t+k})^2]; \text{ or}$$

$$\Delta_t = \sum_{i=1}^{N} \sum_{k=0}^{i} c_{i,k} [(x_{t-i} - x_{t-k})^2 + (x_{t-i} - x_{t+k})^2 +$$
$$(x_{t+i} - x_{t-k})^2 + (x_{t+i} - x_{t+k})^2].$$

where, $\Delta_t$ is the nonlinear distortions of the input signal, $c_{i,k}$ is the nonlinear coefficients, $x_{t-i}$, $x_{t-k}$, $x_{t+i}$ and $x_{t+k}$ are the values of the input signal at different time, and N is a natural number;

where, the nonlinear coefficients $c_{i,k}$ can be obtained by the existing adaptive algorithm and can also be calculated according to a unit impulse response of a channel.

For example, the nonlinear coefficients $c_{i,k}$ can be calculated by the following formula:

$$c_{i,k} = \frac{1}{4P_0} \text{Re}(h_k h_i^*)$$

where, $P_0$ is DC optical power and h is a unit impulse response of a channel;

wherein h can also be calculated by the known calculation method, which will not be described any further.

In this embodiment, as described in Embodiment 2 to Embodiment 4, the method can be applied to a receiver end of the IM-DD system and can also be applied to a transmitter end of the IM-DD system, or simultaneously applied to the transmitter end and the receiver end of the IM-DD system, which will not be described any further.

By applying the method of the embodiment of the present invention, the nonlinear terms resulted from a square-law detector are taken into consideration, and thus nonlinear cost of the IM-DD system can be effectively reduced, thereby improving the system capacity.

FIG. 7 shows a schematic diagram of comparison of performances of a system not using a nonlinear equalizer and using the nonlinear equalizer of an embodiment of the present invention in a typical 100 kilometers intensity modulation-direct detection optical transmission experiment. It can be seen from FIG. 7 that the nonlinear equalizer of the embodiments of the present invention can effectively improve performance, wherein 50% of the system capacity is increased.

An embodiment of the present invention further provides a computer-readable program, wherein when the program is executed in a nonlinear equalizer, the program enables the computer to carry out the method of embodiment 5 in the nonlinear equalizer.

An embodiment of the present invention further provides a storage medium in which a computer-readable program is stored, wherein the computer-readable program enables the computer to carry out the method of embodiment 5 in a nonlinear equalizer.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device for . . . " is an explanation of device plus function for describing elements and claims, and it is not desired that any element using no reference to "a device for . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A nonlinear equalizer in an intensity modulation-direct detection (IM-DD) system, wherein the nonlinear equalizer comprises:
    a calculation module for calculating, according to nonlinear coefficients and differences between values of an input signal at different times, nonlinear distortions of the input signal;
    wherein the calculation module calculates the nonlinear distortions of the input signal according to the following formulae:

$$\Delta_t = \sum_{i=-N}^{N} \sum_{k=-N}^{i-1} c_{i,k} (x_{t-i} - x_{t-k})^2, \text{ or;}$$

$$\Delta_t = \sum_{i=1}^{N} \sum_{k=0}^{N} c_{i,k}$$
$$[(x_{t-i} - x_{t-k})^2 + (x_{t-i} - x_{t+k})^2 + (x_{t+i} - x_{t-k})^2 + (x_{t+i} - x_{t+k})^2], \text{ or;}$$

$$\Delta_t = \sum_{i=1}^{N} \sum_{k=0}^{i} c_{i,k} [(x_{t-i} - x_{t-k})^2 + (x_{t-i} - x_{t+k})^2 +$$
$$(x_{t+i} - x_{t-k})^2 + (x_{t+i} - x_{t+k})^2];$$

where $\Delta_t$ is the nonlinear distortions of the input signal, $c_{i,k}$ is the nonlinear coefficient, $x_{t-i}, x_{t-k}, x_{t+i}$ and $x_{t+k}$ are the values of the input signal at different times, and N is a natural number.

2. The nonlinear equalizer according to claim 1, wherein, when the calculation module calculates the nonlinear distortions of the input signal according to the formulae $$\Delta_t = \sum_{i=-N}^{N} \sum_{k=-N}^{i-1} c_{i,k} (x_{t-i} - x_{t-k})^2,$$

the calculation module comprises:
    2N delayers for delaying the input signal in accordance with a predetermined sampling interval;
    $2N^2+N$ adders for performing a difference operation on the values of the input signal at different times;
    $2N^2+N$ squarers for performing a square operation on the differences between the values of the input signal at different times; and
    one summator for performing a summation operation on the operation result of each of the squarers.

3. The nonlinear equalizer according to claim 1, wherein the nonlinear coefficient $c_{i,k}$ is calculated according to the unit impulse response h of a channel:

$$c_{i,k} = \frac{1}{4P_0} \text{Re}(h_k h_i^*),$$

where, $P_0$ is DC optical power.

4. A receiver, comprising: a nonlinear equalizer, the nonlinear equalizer comprises:
    a calculation module for calculating, according to nonlinear coefficients and differences between values of an input signal at different times, nonlinear distortions of the input signal;
    wherein the calculation module calculates the nonlinear distortions of the input signal according to the following formula:

$$\Delta_t = \sum_{i=-N}^{N} \sum_{k=-N}^{i-1} c_{i,k} (x_{t-i} - x_{t-k})^2, \text{ or;}$$

$$\Delta_t = \sum_{i=1}^{N} \sum_{k=0}^{N} c_{i,k}$$
$$[(x_{t-i} - x_{t-k})^2 + (x_{t-i} - x_{t+k})^2 + (x_{t+i} - x_{t-k})^2 + (x_{t+i} - x_{t+k})^2], \text{ or;}$$

$$\Delta_t = \sum_{i=1}^{N} \sum_{k=0}^{i} c_{i,k} [(x_{t-i} - x_{t-k})^2 + (x_{t-i} - x_{t+k})^2 +$$
$$(x_{t+i} - x_{t-k})^2 + (x_{t+i} - x_{t+k})^2];$$

where $\Delta_t$ is the nonlinear distortions of the input signal, $c_{i,k}$ is the nonlinear coefficient, $x_{t-i}, x_{t-k} x_{t+i}$, and $x_{t+k}$ are the values of the input signal at different times, and N is a natural number.

5. A transmission system, wherein the transmission system comprises the receiver as claimed in claim 4.

6. The receiver according to claim 4, wherein, when the calculation module calculates the nonlinear distortions of the input signal according to the formulae $$\Delta_t = \sum_{i=-N}^{N} \sum_{k=-N}^{i-1} c_{i,k}(x_{t-i} - x_{t-k})^2,$$

the calculation module comprises:
- 2N delayers for delaying the input signal in accordance with a predetermined sampling interval;
- $2N^2+N$ adders for performing a difference operation on the values of the input signal at different times;
- $2N^2+N$ squarers for performing a square operation on the differences between the values of the input signal at different times; and
- one summator for performing a summation operation on the operation result of each of the squarers.

7. The receiver according to claim 4, wherein the nonlinear coefficient $c_{i,k}$ is calculated according to the unit impulse response h of a channel:

$$c_{i,k} = \frac{1}{4P_0} \operatorname{Re}(h_k h_i^*),$$

where, $P_0$ is DC optical power.

8. A transmitter, comprising: a nonlinear equalizer, the nonlinear equalizer comprises:
- a calculation module for calculating, according to nonlinear coefficients and differences between values of an input signal at different times, nonlinear distortions of the input signal;
- wherein the calculation module calculates the nonlinear distortions of the input signal according to the following formulae:

$$\Delta_t = \sum_{i=-N}^{N} \sum_{k=-N}^{i-1} c_{i,k}(x_{t-i} - x_{t-k})^2, \text{ or;}$$

$$\Delta_t = \sum_{i=1}^{N} \sum_{k=0}^{N} c_{i,k} [(x_{t-i} - x_{t-k})^2 + (x_{t-i} - x_{t+k})^2 + (x_{t+i} - x_{t-k})^2 + (x_{t+i} - x_{t+k})^2], \text{ or;}$$

$$\Delta_t = \sum_{i=1}^{N} \sum_{k=0}^{i} c_{i,k} [(x_{t-i} - x_{t-k})^2 + (x_{t-i} - x_{t+k})^2 + (x_{t+i} - x_{t-k})^2 + (x_{t+i} - x_{t+k})^2];$$

where $\Delta_t$ is the nonlinear distortions of the input signal, $c_{i,k}$ is the nonlinear coefficient, $x_{t-i}$, $x_{t-k}$, $x_{t+i}$, and $x_{t+k}$ are the values of the input signal at different times, and N is a natural number.

9. A transmission system, wherein the transmission system comprises the transmitter as claimed in claim 8.

10. The transmitter according to claim 8, wherein, when the calculation module calculates the nonlinear distortions of the input signal according to the formulae $$\Delta_t = \sum_{i=-N}^{N} \sum_{k=-N}^{i-1} c_{i,k}(x_{t-i} - x_{t-k})^2,$$

the calculation module comprises:
- 2N delayers for delaying the input signal in accordance with a predetermined sampling interval;
- $2N^2+N$ adders for performing a difference operation on the values of the input signal at different times;
- $2N^2+N$ squarers for performing a square operation on the differences between the values of the input signal at different times; and
- one summator for performing a summation operation on the operation result of each of the squarers.

11. The transmitter according to claim 8, wherein the nonlinear coefficient $c_{i,k}$ is calculated according to the unit impulse response h of a channel:

$$c_{i,k} = \frac{1}{4P_0} \operatorname{Re}(h_k h_i^*),$$

where, $P_0$ is DC optical power.

12. A method for compensating nonlinear distortions in an intensity modulation-direct detection (IM-DD) system, wherein the method comprises:
- calculating, according to nonlinear coefficients and differences between values of an input signal at different times, nonlinear distortions of the input signal;
- wherein the step of calculating in particular comprises: calculating the nonlinear distortions of the input signal according to the following formulae:

$$\Delta_t = \sum_{i=-N}^{N} \sum_{k=-N}^{i-1} c_{i,k}(x_{t-i} - x_{t-k})^2, \text{ or;}$$

$$\Delta_t = \sum_{i=1}^{N} \sum_{k=0}^{N} c_{i,k} [(x_{t-i} - x_{t-k})^2 + (x_{t-i} - x_{t+k})^2 + (x_{t+i} - x_{t-k})^2 + (x_{t+i} - x_{t+k})^2], \text{ or;}$$

$$\Delta_t = \sum_{i=1}^{N} \sum_{k=0}^{i} c_{i,k} [(x_{t-i} - x_{t-k})^2 + (x_{t-i} - x_{t+k})^2 + (x_{t+i} - x_{t-k})^2 + (x_{t+i} - x_{t+k})^2];$$

where $\Delta_t$ is the nonlinear distortions of the input signal, $c_{i,k}$ is the nonlinear coefficient, $x_{t-i}$, $x_{t-k}$ $x_{t+i}$ and $x_{t+k}$ are the values of the input signal at different times, and N is a natural number.

13. The method according to claim 12, wherein the nonlinear coefficient $c_{i,k}$ is calculated according to the unit impulse response h of a channel:

$$c_{i,k} = \frac{1}{4P_0} \operatorname{Re}(h_k h_i^*),$$

where $P_0$ is DC optical power.

* * * * *